(12) United States Patent
Tomaru et al.

(10) Patent No.: US 9,886,791 B2
(45) Date of Patent: Feb. 6, 2018

(54) THREE-DIMENSIONAL INFORMATION PROCESSING DEVICE

(71) Applicants: Yoshihiro Tomaru, Chiyoda-ku (JP); Jumpei Hato, Chiyoda-ku (JP)

(72) Inventors: Yoshihiro Tomaru, Chiyoda-ku (JP); Jumpei Hato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 256 days.

(21) Appl. No.: 14/765,889

(22) PCT Filed: Mar. 12, 2013

(86) PCT No.: PCT/JP2013/056797
§ 371 (c)(1),
(2) Date: Aug. 5, 2015

(87) PCT Pub. No.: WO2014/141383
PCT Pub. Date: Sep. 18, 2014

(65) Prior Publication Data
US 2016/0005222 A1    Jan. 7, 2016

(51) Int. Cl.
*G06T 17/05* (2011.01)
*G06T 17/20* (2006.01)
*G06T 19/20* (2011.01)

(52) U.S. Cl.
CPC .............. *G06T 17/05* (2013.01); *G06T 17/20* (2013.01); *G06T 19/20* (2013.01); *G06T 2210/04* (2013.01); *G06T 2219/2004* (2013.01); *G06T 2219/2016* (2013.01)

(58) Field of Classification Search
None
See application file for complete search history.

(56) References Cited

FOREIGN PATENT DOCUMENTS

| CN | 102254350 A | 11/2011 |
|---|---|---|
| JP | 10-187029 A | 7/1998 |
| JP | 2001-266177 A | 9/2001 |
| JP | 2002-366977 A | 12/2002 |
| JP | 2007-4294 A | 1/2007 |

OTHER PUBLICATIONS

Office Action dated Dec. 27, 2016 in Chinese Patent Application No. 201380074477.8 (with Partial English language translation).
International Search Report dated Apr. 16, 2013 for PCT/JP2013/056797 filed on Mar. 12, 2013.

*Primary Examiner* — Michelle Chin
(74) *Attorney, Agent, or Firm* — Oblon, McClelland, Maier & Neustadt, L.L.P.

(57) ABSTRACT

A three-dimensional information processing apparatus includes: a bottom surface intersection point calculation unit calculating intersection points between segments formed by a set of vertices for a terrain model generated by a terrain vertex synthesis unit and outer peripheral segments of a bottom surface of a structure model extracted by a structure bottom surface extraction unit; an all-point height calculation unit calculating heights of the terrain model at the intersection points calculated by the calculation unit and at the vertices constituting the bottom surface of the structure model; a reference height calculation unit calculating a reference height in three-dimensional information on a predetermined area from the heights of the terrain model; and a structure height correction unit correcting the height of the structure model in use of differences between the reference height and the heights of the terrain model.

7 Claims, 13 Drawing Sheets

THREE-DIMENSIONAL INFORMATION PROCESSING DEVICE

TECHNICAL FIELD

The present invention relates to a three-dimensional information processing apparatus adjusting display information in a height direction in a three-dimensional model such as a building.

BACKGROUND ART

For example, an apparatus having a map display function such as car navigation has a three-dimensional map bird's-eye-view display function to arrange building models such as commercial facilities on a rough three-dimensional terrain model, and display the terrain model, and the building models in a bird's-eye-view manner. The data for realizing the three-dimensional map bird's-eye-view display function is generally the terrain model and/or building models of three-dimensional information that are provided by a map data production company. These pieces of three-dimensional information are made based on data through field positioning. However, the field positioning of the three-dimensional information on the terrain and buildings involves errors, and thus, there is a problem such that when a three-dimensional map based on the three-dimensional information is displayed, the building models rise from the terrain model or the building models sink in the terrain model.

As a countermeasure against this, Patent Document 1 discloses altitude correction processing compatible with an actual terrain including: extracting, from three-dimensional terrain data, altitudes at respective vertex coordinates of a building bottom surface to be subjected to the processing; adding the maximum value out of the extracted altitudes to the height coordinates of the vertices other than the building bottom surface as a reference altitude of the building; and adding the minimum value out of the extracted altitudes to the height coordinates of the vertices of the building bottom surface as a bottom surface altitude of the building to thereby restrain the building models from rising from the terrain model, or restrain the building models from sinking in the terrain model.

CITATION LIST

Patent Document

Patent Document 1: Japanese Patent Application Laid-open No. 2001-266177

SUMMARY OF THE INVENTION

Problems to be Solved by the Invention

However, the technique disclosed in Patent Document 1 described above takes only the altitudes of the respective vertex coordinates of the building bottom surface into account, and thus, when the terrain existing at the position of the building bottom surface is very rough and the distance between the vertices of the building bottom surface is long, there is a problem such that a gap is generated between the terrain model and the building model or the building model sinks excessively in the terrain model.

For example, when the altitudes at two vertices of a certain building bottom surface are both 5 m and the altitude of the terrain between the two vertices is 0 m at a minimum, the altitude of the building bottom surface is adjusted to 5 m though it should be originally adjusted to 0 m. As a result, the building model rises from the terrain model.

The present invention has been made to solve the foregoing problems, and an object of the invention is to provide a three-dimensional information processing apparatus capable of restraining the building model from rising from the terrain model or restraining the building model from sinking excessively in the terrain model even when the terrain is very rough and the distance between the vertices of the building bottom surface is long.

Means for Solving the Problems

A three-dimensional information processing apparatus according to the present invention includes: a structure bottom surface range calculator that determines, as a bottom surface range of a structure model, a range including a bottom surface of the structure model; a terrain vertex synthesizer that determines a set of vertices for the terrain model including the bottom surface range of the structure model; a bottom surface intersection point calculator that determines intersection points between segments formed by the set of vertices for the terrain model and outer peripheral segments of the bottom surface of the structure model; an all-point height calculator that determines heights of the terrain model at the intersection points and at a plurality of points constituting the bottom surface of the structure model; a reference height calculator that determines a reference height in three-dimensional information on a predetermined area from the heights of the terrain model; and a structure height corrector that corrects the height of the structure model using the reference height and the heights of the terrain model at the plurality of points constituting the bottom surface of the structure model.

Effect of the Invention

According to the invention, the three-dimensional information can be provided to restrain occurrence of a malfunction in which the building model rises from the terrain model or the building model sinks excessively in the terrain model.

MODES FOR CARRYING OUT THE INVENTION

Hereinafter, for illustrating the present invention in more detail, embodiments for carrying out the invention will be described in accordance with the accompanying drawings. Furthermore, the following embodiments will be described using a terrain model in which a terrain in a predetermined area is represented by three-dimensional coordinates, and a building model in which a building positioned in the predetermined area is represented by the three-dimensional coordinates. However, the invention is not limited to the buildings, but various structures and the like included in three-dimensional information may be targets.

Embodiment 1

Figure 1:
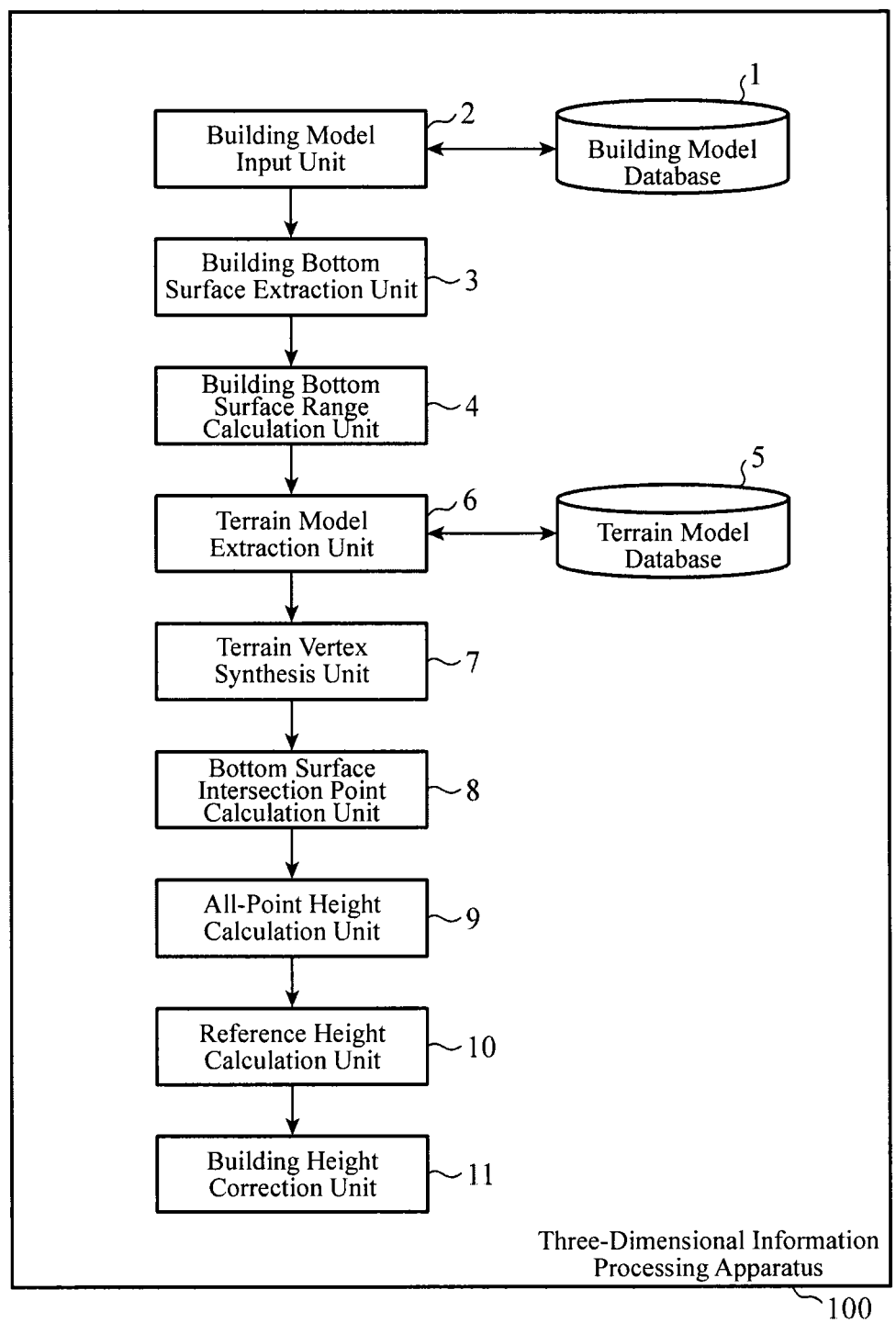
FIG. 1 is a block diagram depicting a configuration of a three-dimensional information processing apparatus according to Embodiment 1.

FIG. 1 is a block diagram showing a configuration of a three-dimensional information processing apparatus according to Embodiment 1 of the present invention.

A three-dimensional information processing apparatus 100 includes a building model database 1, a building model input unit 2, a building bottom surface extraction unit (structure bottom surface extraction unit) 3, a building bottom surface range calculation unit (structure bottom surface range calculation unit) 4, a terrain model database 5, a terrain model extraction unit 6, a terrain vertex synthesis unit 7, a bottom surface intersection point calculation unit 8, an all-point height calculation unit 9, a reference height calculation unit 10, and a building height correction unit (structure height correction unit) 11.

The building model database 1 is a database in which building models expressed as three-dimensional models of a plurality of buildings existing in an arbitrary map range are accumulated. The building model input unit 2 acquires a building model related to one building from the building model database 1. The building bottom surface extraction unit 3 extracts vertices constituting a bottom surface of the building model acquired by the building model input unit 2. The building bottom surface range calculation unit 4 calculates a range in which the building exists on the map based on the vertices of the bottom surface of the building model. The terrain model database 5 is a database in which terrain models expressed as three-dimensional models of terrains are accumulated. The terrain model extraction unit 6 extracts from the terrain model database 5 all terrain models existing within the range calculated by the building bottom surface range calculation unit 4. The terrain vertex synthesis unit 7 synthesizes adjacent terrain models in the terrain models extracted by the terrain model extraction unit 6 to be gathered into one vertex group.

The bottom surface intersection point calculation unit 8 calculates intersection points between a group of two-dimensional segments resulting from projection of all segments constituted by synthesized terrain vertices onto a horizontal plane, and a group of two-dimensional segments resulting from projection of outer peripheral segments of a building bottom surface onto the horizontal plane. The all-point height calculation unit 9 calculates heights at all the intersection points acquired by the bottom surface intersection point calculation unit 8 and heights at the vertices constituting the building bottom surface. The reference height calculation unit 10 uses the heights at all the vertices calculated by the all-point height calculation unit 9 to calculate the height of the corrected building model. The building height correction unit 11 corrects the heights at all the vertices constituting the building model using the height calculated by the reference height calculation unit 10, and reconstruct the building model.

Next, operations of the three-dimensional information processing apparatus will be described by referring to a flowchart in FIG. 2 and diagrams in FIGS. 3A, 3B to 12.

Figure 2:
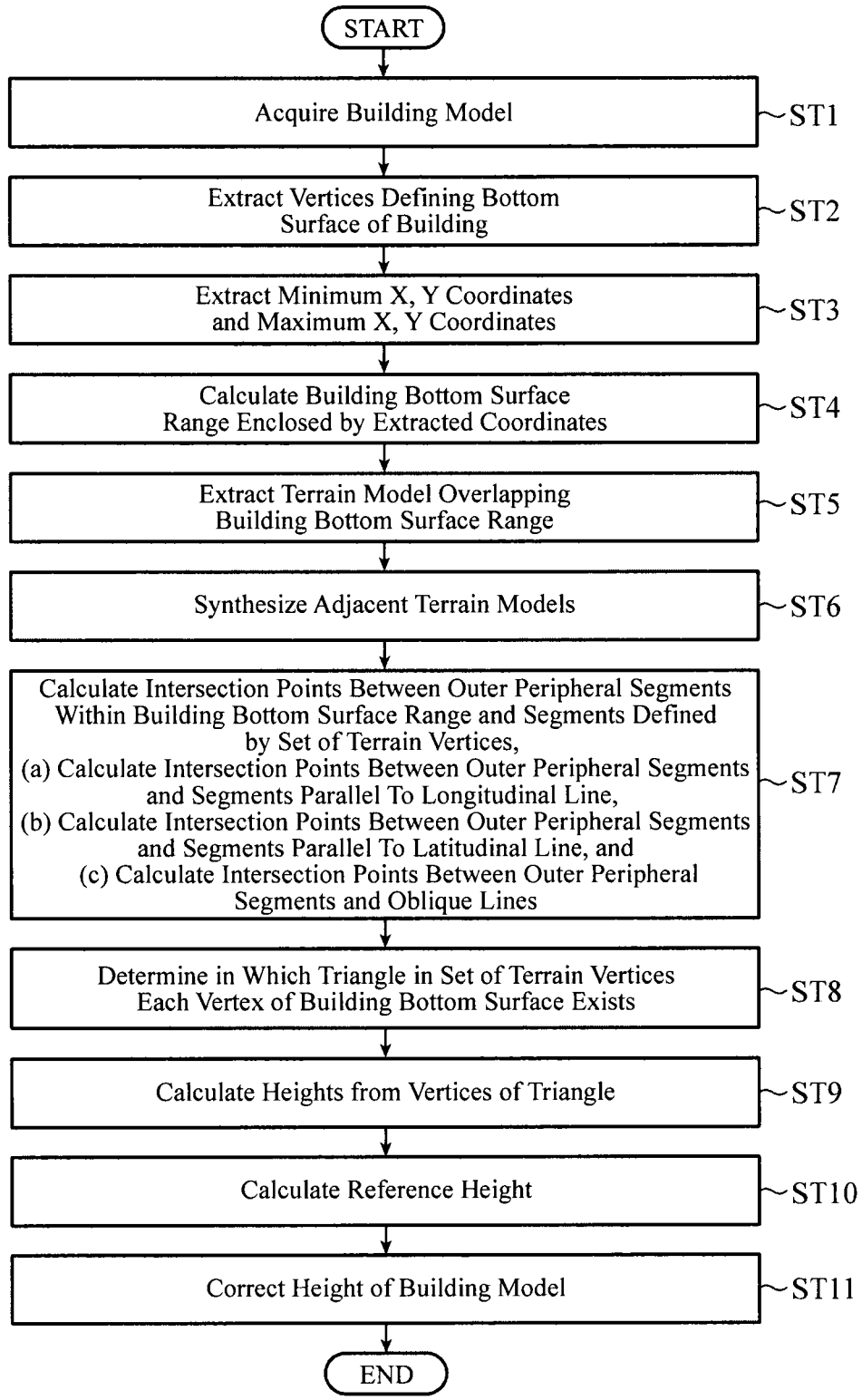
FIG. 2 is a flowchart illustrating operations of the three-dimensional information processing apparatus according to Embodiment 1.

FIG. 2 is a flowchart illustrating the operations of the three-dimensional information processing apparatus according to Embodiment 1.

Figure 3A:
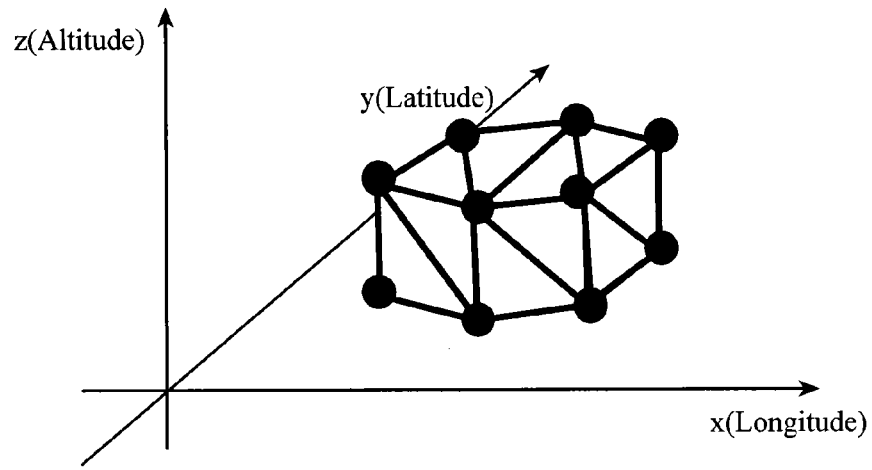
FIGS. 3A, 3B are diagrams depicting an example of a building model accumulated in a building database in the three-dimensional information processing apparatus according to Embodiment 1.
Figure 3B:
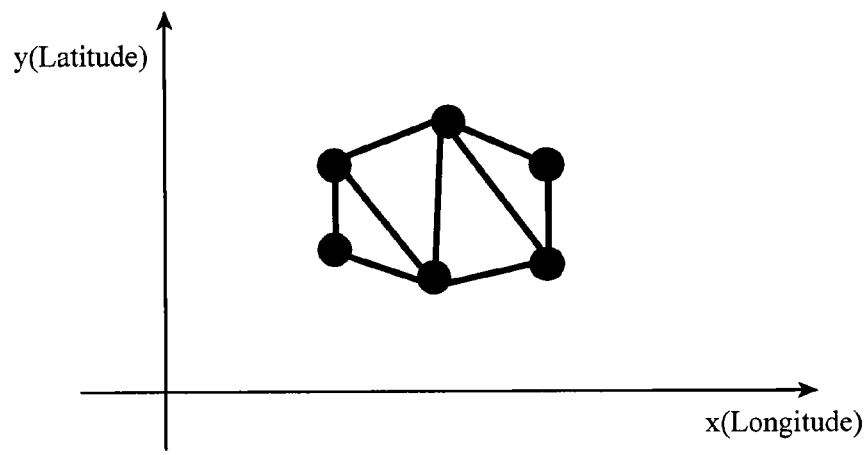

First, the building model input unit 2 acquires one building model from the building model database 1 (step ST1). FIGS. 3A, 3B are diagrams depicting an example of the building model accumulated in the building model database 1; FIG. 3A is a bird's eye view thereof, and FIG. 3B is a horizontal plane projection view thereof. The building model is a set of hexagonal columns as depicted in FIG. 3A, and three-dimensional coordinates of each vertex include: an X coordinate and a Y coordinate that are a longitudinal coordinate and a latitudinal coordinate, respectively; and a Z coordinate that is an altitude (m series). In the processing of step ST1, data of the hexagonal column as depicted in FIGS. 3A, 3B is acquired.

Then, the building bottom surface extraction unit 3 extracts only the vertices constituting the bottom surface of the building from the building model acquired in step ST1 (step ST2). Specifically, only the vertices which have the minimum Z value (height) are extracted out of the ones constituting the building model. The building bottom surface range calculation unit 4 extracts the minimum X and Y coordinates and the maximum X and Y coordinates from the X and Y coordinates of the vertices constituting the bottom surface of the building extracted in step ST2 (step ST3), and calculates, as a building bottom surface range, a range enclosed by points obtained by a combination of the extracted minimum X and Y coordinates and maximum X and Y coordinates is calculated (step ST4).

Figure 4:
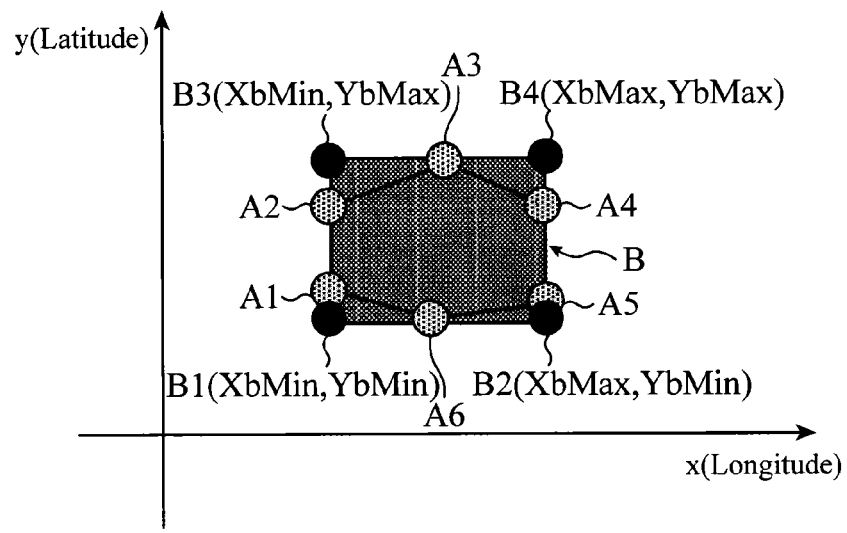
FIG. 4 is a diagram depicting an example of a calculation of a building bottom surface range in the three-dimensional information processing apparatus according to Embodiment 1.

FIG. 4 is a diagram illustrating an example of the calculation of the building bottom surface range by the building bottom surface range calculation unit 4, and depicting a horizontal plane projection view in which the building bottom surface and building bottom surface range are projected onto the horizontal plane.

By referring to FIG. 4, a method of calculating the building bottom rage is explained in detail. In step ST3, the X and Y coordinates of all the building bottom surface range vertices A1, A2, A3, A4, A5, and A6 extracted by the building bottom surface extraction unit 3 are used, and out of the coordinates, the minimum X coordinate (XbMin), the minimum Y coordinate (YbMin), the maximum X coordinate (XbMax), and the maximum Y coordinate (YbMax) are extracted. Subsequently, in step ST4, a range B enclosed by four points of a vertex B1 (XbMin, YbMin), a vertex B2 (XbMax, YbMin), a vertex B3 (XbMin, YbMax), and a vertex B4 (XbMax, YbMax) obtained by a combination of the extracted coordinates is calculated as a building bottom surface range B. As depicted in FIG. 4, the building bottom surface range B is equivalent to a circumscribing rectangle circumscribing the range obtained in the projection of the building bottom surface onto the horizontal surface.

The terrain model extraction unit 6 extracts from the terrain model database 5 the terrain model overlapping the building bottom surface range calculated in step ST4 (step ST5).

Figure 5A:
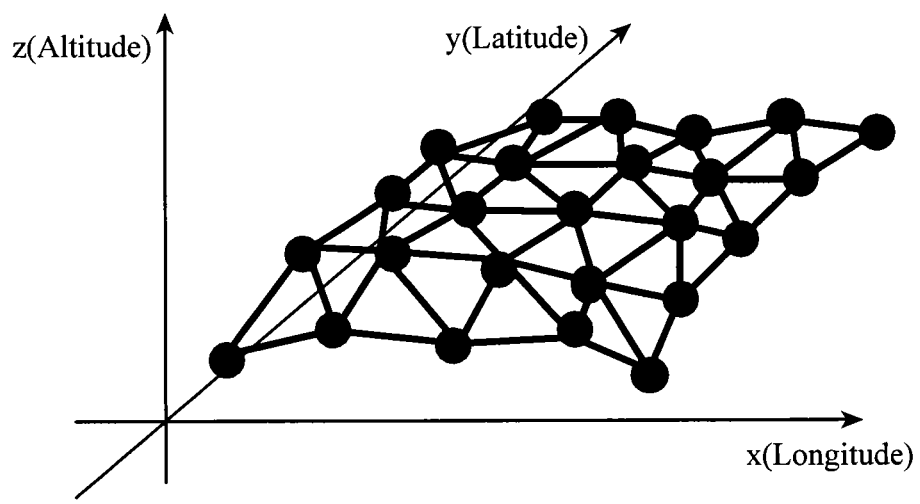
FIGS. 5A, 5B are diagrams depicting an example of a terrain model accumulated in a terrain database in the three-dimensional information processing apparatus according to Embodiment 1.
Figure 5B:
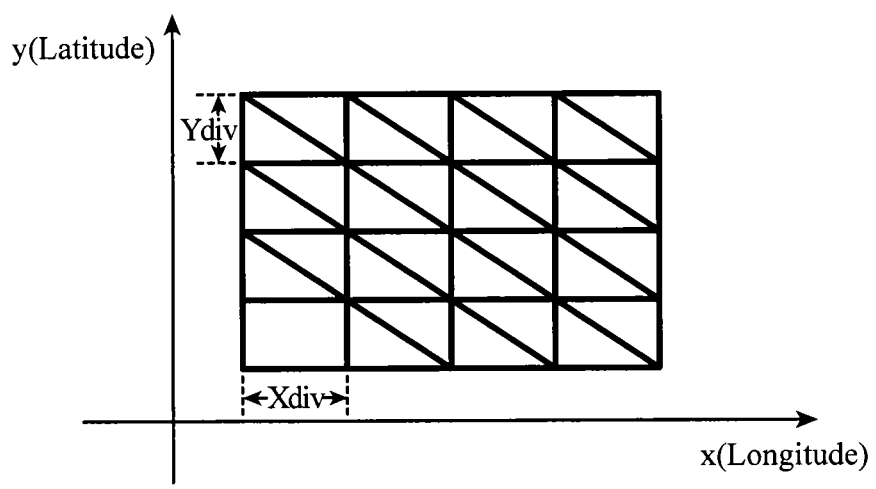

FIGS. 5A, 5B are diagrams depicting an example of the terrain models accumulated in the terrain model database 5; FIG. 5A is a bird's eye view thereof, and a FIG. 5B is a horizontal plane projection view thereof. As depicted in FIG. 5A, in the terrain model as well as the building model, an X coordinate and a Y coordinate of the vertex are a longitudinal coordinate and a latitudinal coordinate, respectively, and a Z coordinate is an altitude (m series). Furthermore, when the terrain model is projected onto the horizontal plane, a set of mesh models is provided to include a set of vertices constituting a lattice including straight lines parallel to a latitude line and a longitude line as depicted in FIG. 5B.

As depicted in FIG. 5B, the coordinates of the vertices constituting one terrain model are denoted as follows: the minimum X coordinate is XlMin, the minimum Y coordinate is YlMin, the maximum X coordinate is XlMax, and the maximum Y coordinate is YlMax, and an inter-vertex distance in the longitudinal direction is Xdiv, and the inter-vertex distance in the latitudinal direction is Ydiv. Furthermore, when the number of vertices in the longitudinal direction constituting the terrain model is XNum and the number of vertices in the latitudinal direction constituting the terrain model is YNum, XNum and YNum shall be all the same number in each terrain model. Note that XNum and YNum each may be a different number.

For details of the extraction of the terrain model, the building bottom surface range of the building model calculated in step ST4 and the minimum X and Y coordinates and the maximum X and Y coordinates of each terrain model accumulated in the terrain model database 5 are compared with one another using Expression (1) illustrated below, and only models with true results are extracted. The extraction using Expression (1) allows extraction of all the terrain models that overlap even partly the building bottom surface.

$$(X_b\text{Min} \leq X_l\text{Max}) \cap (X_l\text{Min} \leq X_b\text{Max}) \cap (Y_b\text{Min} \leq Y_l\text{Max}) \cap (Y_l\text{Min} \leq Y_b\text{Max}) \quad (1)$$

The terrain vertex synthesis unit 7 synthesizes adjacent terrain models of the terrain models extracted in step ST4 to generate a set of terrain vertices (step ST6).

Figure 6A:
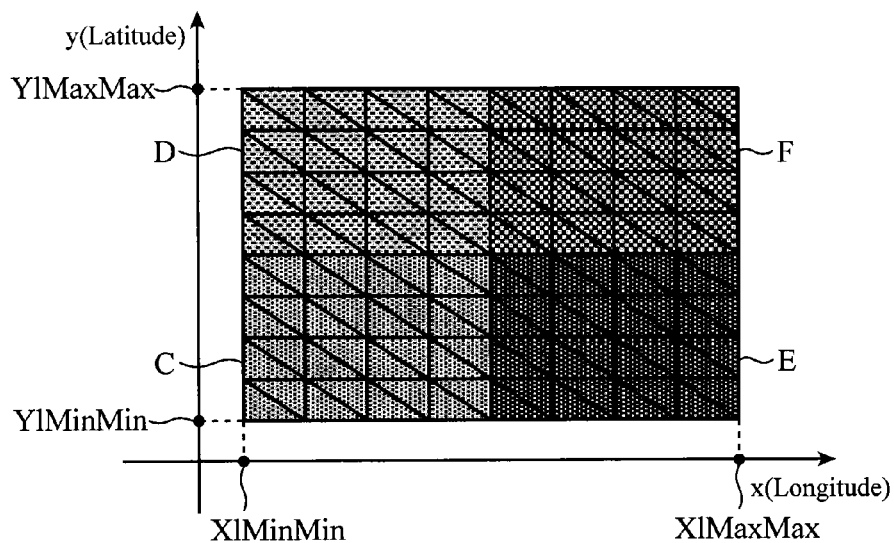
FIGS. 6A, 6B are diagrams illustrating synthesis of the terrain model in the three-dimensional information processing apparatus according to Embodiment 1.
Figure 6B:
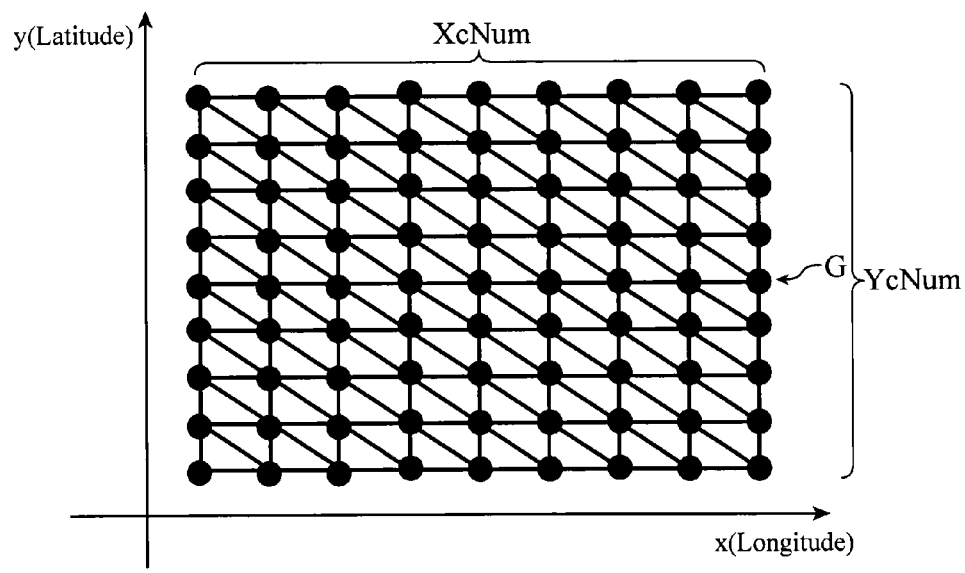

FIGS. 6A, 6B are diagrams illustrating the synthesis of the terrain models by the terrain vertex synthesis unit 7; FIG. 6A depicts the terrain models before the synthesis, and FIG. 6B depicts the terrain models after the synthesis.

As depicted in FIG. 6A, when four terrain models C, D, E, and F, for example, are extracted in step ST5, the minimum XlMin value (XlMinMin), maximum XlMax value (XlMaxMax), minimum YlMin value (YlMinMin), and maximum YlMax value (YlMaxMax) in the four terrain models are acquired. In the case of FIG. 6(a), XlMinMin is an XlMin value for the terrain model C, XlMaxMax is an XlMax value for the terrain model E, YlMinMin is a YlMin value for the terrain model C, and YlMaxMax is a YlMax value for the terrain model F.

Then, the number XcNum of vertices in the longitudinal direction and the number YcNum of vertices in the latitudinal direction in the set of vertices after the synthesis are calculated based on Expression (2) illustrated below.

$$X_c\text{Num} = (X_l\text{MaxMax} - X_l\text{MinMin})/X\text{Div}$$

$$Y_c\text{Num} = (Y_l\text{MaxMax} - Y_l\text{MinMin})/Y\text{Div} \quad (2)$$

After the calculation, a synthesis vertex storing buffer having an area in which the vertices of XcNum×YcNum are stored is created.

Then, vertex coordinates of each terrain model are set in the synthetic vertices storing buffer using Expression (3) illustrated below to complete the set of terrain vertices.

$$P_c(i, j) = P_l[X_l\text{MinA}, Y_l\text{MinA}](m, n) \quad (3)$$

$$\begin{cases} X_l\text{MinA} = X_l\text{MinMin} + X\text{Div} * (X\text{Num} - 1) * \text{floor}(i/(X\text{Num} - 1)) \\ Y_l\text{MinA} = Y_l\text{MinMin} + Y\text{Div} * (Y\text{Num} - 1) * \text{floor}(j/(Y\text{Num} - 1)) \\ m = i - (X_l\text{MinA} - X_l\text{MinMin})/X\text{Div} \\ n = j - (Y_l\text{MinA} - Y_l\text{MinMin})/Y\text{Div} \end{cases}$$

In Expression (3) described above, $P_c(i,j)$ represents the ith vertex coordinate (i starts at 0) in the longitudinal direction and the jth vertex coordinate (j starts at 0) in the latitudinal direction from a southeast end in the synthetic vertex storing buffer to be set, and $P_l[s, t](m, n)$ represents the mth vertex coordinate (m starts at 0) in the longitudinal direction and the nth vertex coordinate (n starts at 0) in the latitudinal direction in the terrain model having the X and Y coordinates (s, t) as XlMin and YlMin. The floor is a floor function that truncates decimal places. In the terrain model after the synthesis depicted in FIG. 6B, a set of terrain vertices G is generated.

The bottom surface intersection point calculation unit 8 calculates intersection points between segments constituted by vertices resulting from projection of the set of terrain vertices generated in step ST6 onto the horizontal plane and outer peripheral segments of the building bottom surface resulting from projection of the building bottom surface onto the horizontal plane (step ST7). For the calculation of the intersection points, in the segments constituted by the set of terrain vertices, the points are divided into the following three: the intersection points with the segments parallel to longitude lines; the intersection points with the segments parallel to latitude lines, and the intersection points with oblique lines.

(a) Calculation of Intersection Points with Segments Parallel to Longitude Lines For each segment constituting the outer periphery of the building bottom surface, the intersection points parallel to the longitude lines out of the segments constituted by the set of terrain vertices are calculated. Opposite end coordinates of a certain segment on the outer periphery of the building bottom surface are $(X_a, Y_a)$ and $(X_b, Y_b)$. Note that it is assumed to satisfy a relation $X_a \leq X_b$. First, an equation of a straight line passing through two vertices is calculated using the following Expression (4).

$$y = (Y_b - Y_a)(x - X_a)/(X_b - X_a) + Y_a \qquad (4)$$

Then, the X coordinates of the segments which are parallel to the longitude lines out of the segments constituted by the set of terrain vertices existing between $X_a$ and $X_b$ are calculated using Expression (5) illustrated below.

$$X_l = X_l\text{MinMin} + k*X\text{ Div} \qquad (5)$$

In FIG. (5), k is an integer that meets:

$$\text{floor}((X_a - X_l\text{MinMin})/X\text{ Div}) < k \leq \text{floor}((X_b - X_l\text{MinMin})/X\text{ Div}).$$

All of $X_k$ calculated using Expression (5) described above are substituted into Expression (4) described above to calculate $Y_k$. This set of $(X_k, Y_k)$ includes the coordinates of the intersection points between the segments constituted by two vertices of the building bottom surface and the segments which are parallel to the longitude lines out of the segments constituted by the set of terrain vertices. The above-described processing is the one for one segment on the outer periphery of a certain building bottom surface; when this is executed on all the segments on the outer periphery, the calculations of the intersection points with the segments parallel to the longitude line are completed.

Figure 7:
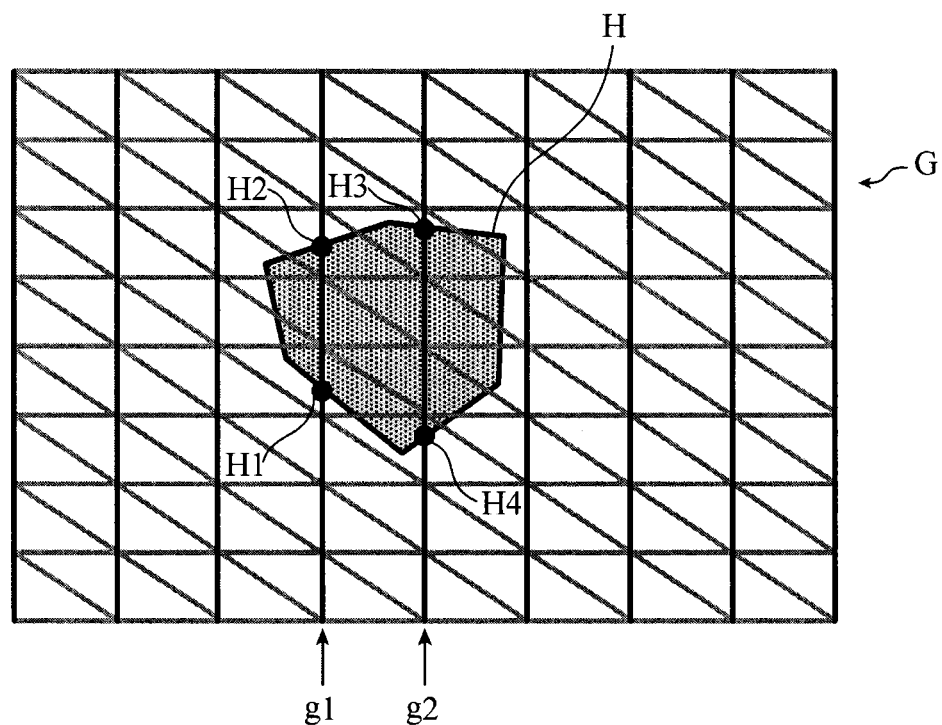
FIG. 7 is a diagram illustrating a calculation of intersection points with segments parallel to a longitude line in the three-dimensional information processing apparatus according to Embodiment 1.

FIG. 7 is a diagram depicting the intersection points between the outer periphery of a building bottom surface H and the segments which are parallel to the longitude lines out of the segments constituted by a set of terrain vertices G. An example depicted in FIG. 7 illustrates a case where the outer periphery of the building bottom surface H intersects segments g1, g2 parallel to the longitude lines at intersection points H1, H2, H3, H4.

(b) Calculation of Intersection Points with Segments Parallel to Latitude Lines

For each segment constituting the outer periphery of the building bottom surface, the intersection points with the segments which are parallel to the latitude lines out of the segments constituted by the set of terrain vertices are calculated. Opposite end coordinates of a certain segment on the outer periphery of the building bottom surface are $(X_a, Y_a)$ and $(X_b, Y_b)$. Note that it is assumed to satisfy a relation $Y_a \leq Y_b$. First, the Y coordinates of the segments which are parallel to the latitude lines out of the segments constituted by the set of terrain vertices existing between $Y_a$ and $Y_b$ are calculated using Expression (6) illustrated below.

$$Y_l = Y_l\text{MinMin} + k*Y\text{ Div} \qquad (6)$$

In FIG. (6), k is an integer that meets:

$$\text{floor}((Y_a - Y_l\text{MinMin})/Y\text{ Div}) < k \leq \text{floor}((Y_b - Y_l\text{MinMin})/Y\text{ Div}).$$

All of $Y_k$ calculated using Expression (6) described above are substituted into Expression (4) described above to calculate $X_k$. This set of $(X_k, Y_k)$ includes the coordinates of intersection points between the segments constituted by two vertices of the building bottom surface and the segments which are parallel to the latitude lines out of the segments constituted by the set of terrain vertices. The above-described processing is the one for one segment on the outer periphery of a certain building bottom surface. When this is executed on all the segments on the outer periphery, the calculations of the intersection points with the segments parallel to the latitude lines are completed.

Figure 8:
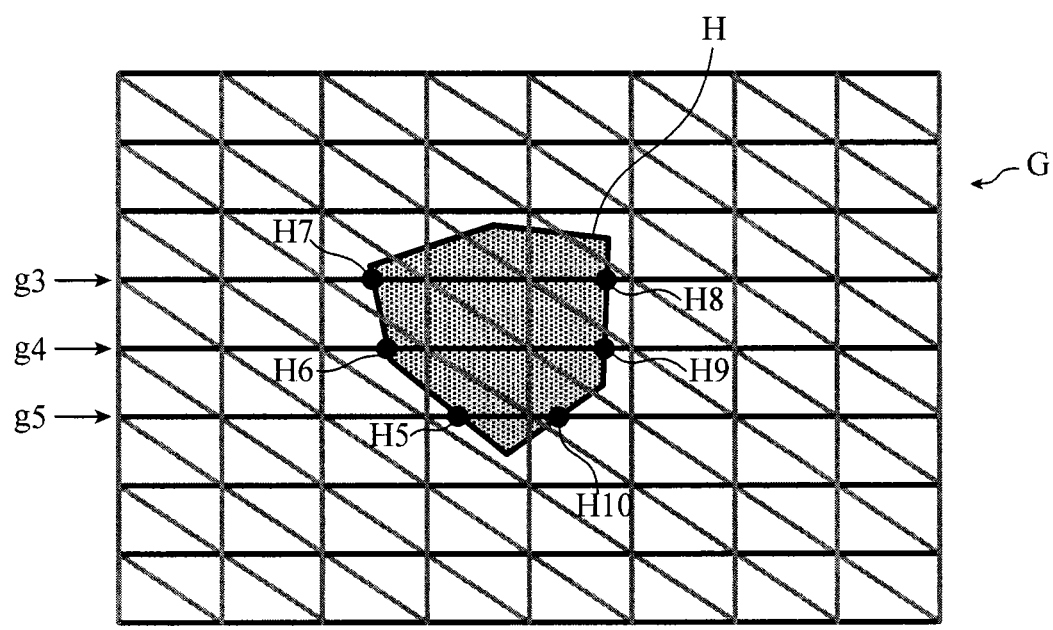
FIG. 8 is a diagram illustrating a calculation of intersection points with the segments parallel to a latitude line in the three-dimensional information processing apparatus according to Embodiment 1.

FIG. 8 is a diagram depicting the intersection points between the outer periphery of the building bottom surface H and the segments which are parallel to the latitude line out of the segments constituted by the set of terrain vertices G. An example depicted in FIG. 8 illustrates a case where the outer periphery of the building bottom surface H intersects segments g3, g4 g5 parallel to the latitude lines at intersection points H5, H6, H7, H8, H9, H10.

(c) Calculation of Intersection Points with Oblique Lines

Figure 9:
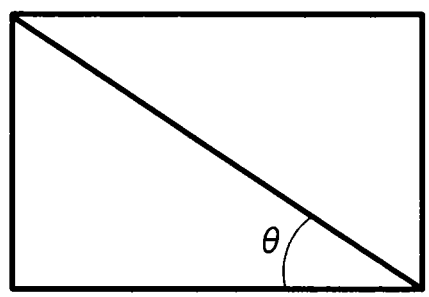
FIG. 9 is a diagram illustrating a calculation of intersection points with segments parallel to an oblique line in the three-dimensional information processing apparatus according to Embodiment 1.

For each segment constituting the outer periphery of the building bottom surface, the intersection points with the oblique lines are calculated out of the segments constituted by the set of terrain vertices. Opposite end coordinates of a certain segment on the outer periphery of the building bottom surface are $(X_a, Y_a)$ and $(X_b, Y_b)$. In this connection, FIG. 9 depicts terrain vertices for one lattice in the set of terrain vertices. As depicted in FIG. 9, an angle between the oblique line and the latitude line is denoted by $\theta (0 \leq \theta \leq \pi/2)$, and $\sin \theta$ and $\cos \theta$ are calculated. With $\tan \theta = Y\text{Div}/X\text{Div}$, hence, they can be easily calculated using a trigonometric function. Then, a coordinate conversion into an X'Y' space is performed, the X' Y' space being a space such that the oblique lines are parallel to the X axis and that the southwest end in the set of terrain vertices is positioned at the origin. The coordinates are converted using Expression (7) illustrated below. Translation to the origin is performed using a matrix T, and rotation by an angle $\theta$ in a y axis direction is performed using a matrix R.

$$(X', Y', 1)' = R * T * (X, Y, 1)' \qquad (7)$$

$$\begin{cases} R = \begin{pmatrix} \cos\theta & -\sin\theta & 0 \\ \sin\theta & \cos\theta & 0 \\ 0 & 0 & 1 \end{pmatrix} \\ T = \begin{pmatrix} 1 & 0 & X_l\text{MinMin} \\ 0 & 1 & Y_l\text{MinMin} \\ 0 & 0 & 1 \end{pmatrix} \end{cases}$$

Figure 10A:
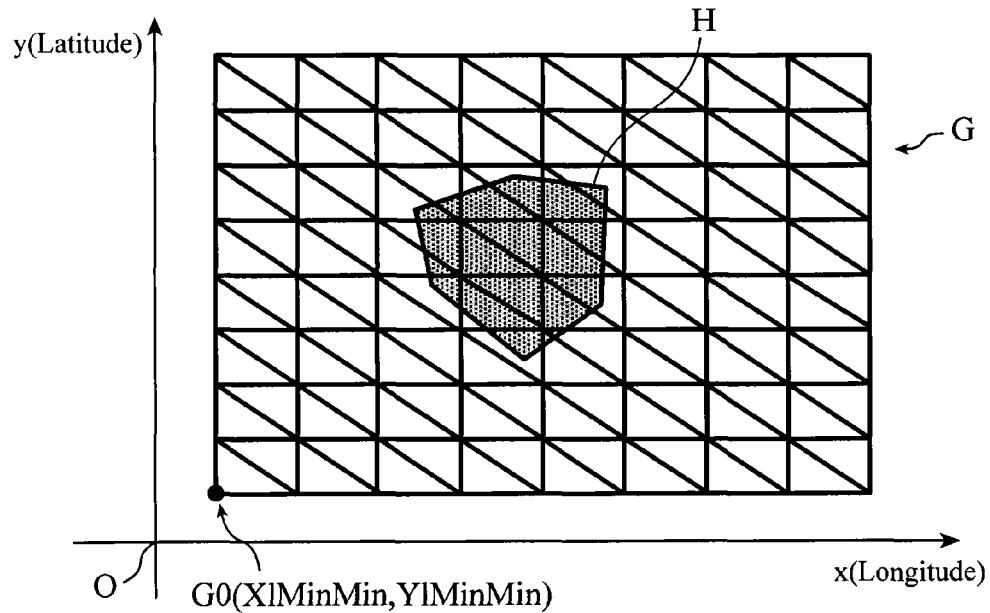
FIGS. 10A, 10B are diagrams illustrating a calculation of intersection points with segments parallel to the oblique line in the three-dimensional information processing apparatus according to Embodiment 1.
Figure 10B:
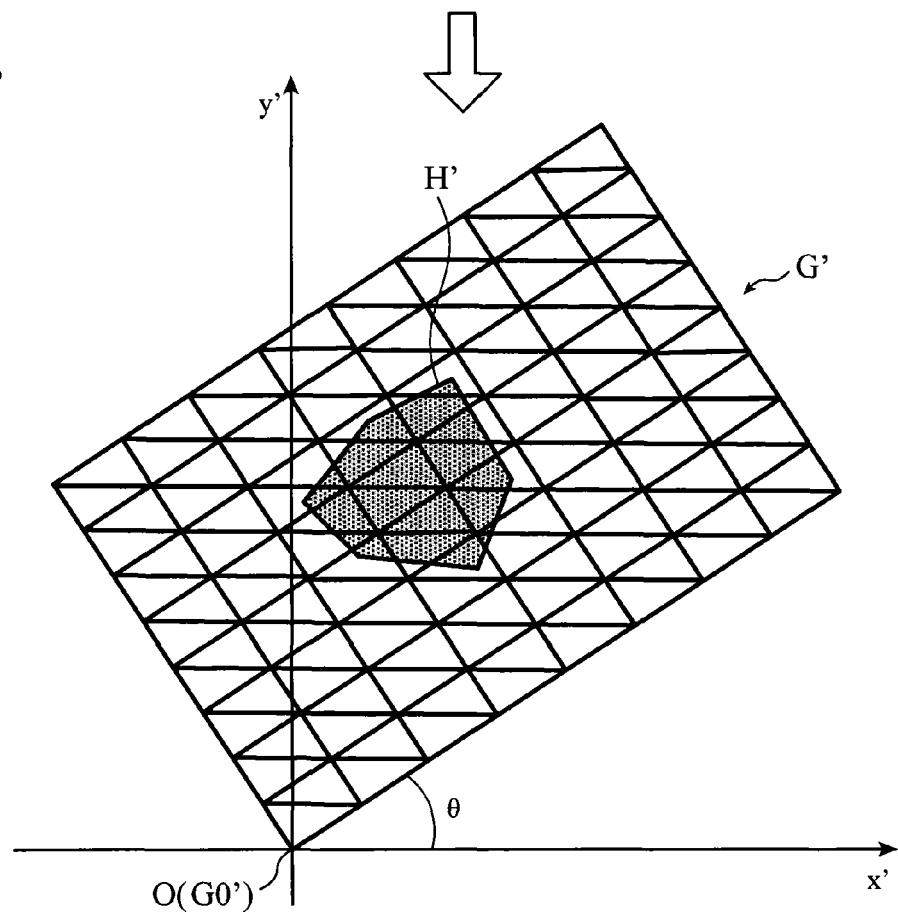

FIGS. 10A, 10B are diagrams illustrating the coordinate conversion in accordance with Expression (7) described above; FIG. 10A depicts the building bottom surface H and the set of terrain vertices G before the coordinate conversion, and FIG. 10B depicts a building bottom surface H' and a set of terrain vertices G' after the coordinate conversion.

In FIG. 10A, in the set of terrain vertices G, a point G0 (XlMinMin, YlMinMin) constituted by the minimum X coordinate value and the minimum Y coordinate value is translated to the origin O, using the matrix T in Expression (7), and further rotated by the angle $\theta$ in the y axis direction using the matrix R. In this manner, the oblique lines constituted by the set of terrain vertices G' are parallel to the x axis direction.

The coordinate conversion using Expression (7) allows the opposite end coordinates $(X_a, Y_a)$, $(X_b, Y_b)$ of a certain segment on the outer periphery of the building bottom surface to be $(X_a', Y_a')$ and $(X_b', Y_b')$. An equation of a straight line passing through both of the converted opposite coordinates is calculated using Expression (8) illustrated below.

$$y' = (Y_b' - Y_a')(x' - X_a')/(X_b' - X_a') + Y_a' \quad (8)$$

Then, the Y' coordinates of the oblique lines in the segments constituted by the set of terrain vertices existing between $Y_a'$ and $Y_b'$ are calculated. This can be calculated using $Y_k'$ depicted in Expression (9) illustrated below.

$$Y_k' = k*Y\,\text{Div}'$$

$$Y\,\text{Div}' = X\,\text{Div}*\sin\theta \quad (9)$$

In Expression (9), k is an integer that meets:

$$\text{floor}(Y_a'/Y\,\text{Div}') < k \le \text{floor}(Y_b'/Y\,\text{Div}').$$

All of $Y_k'$ calculated using Expression (9) described above are substituted into Expression (8) described above to calculate $X_k'$. This set of $(X_k', Y_k')$ includes the coordinates of the intersection points between the segments constituted by two vertices of the building bottom surface and the oblique lines in the segments constituted by the set of terrain vertices. The above-described processing is the one for one segment on the outer periphery of a certain building bottom surface. When this processing is executed on all the segments on the outer periphery of the building bottom surface, the intersection points with the oblique lines in the X'Y' space are calculated.

Figure 11:
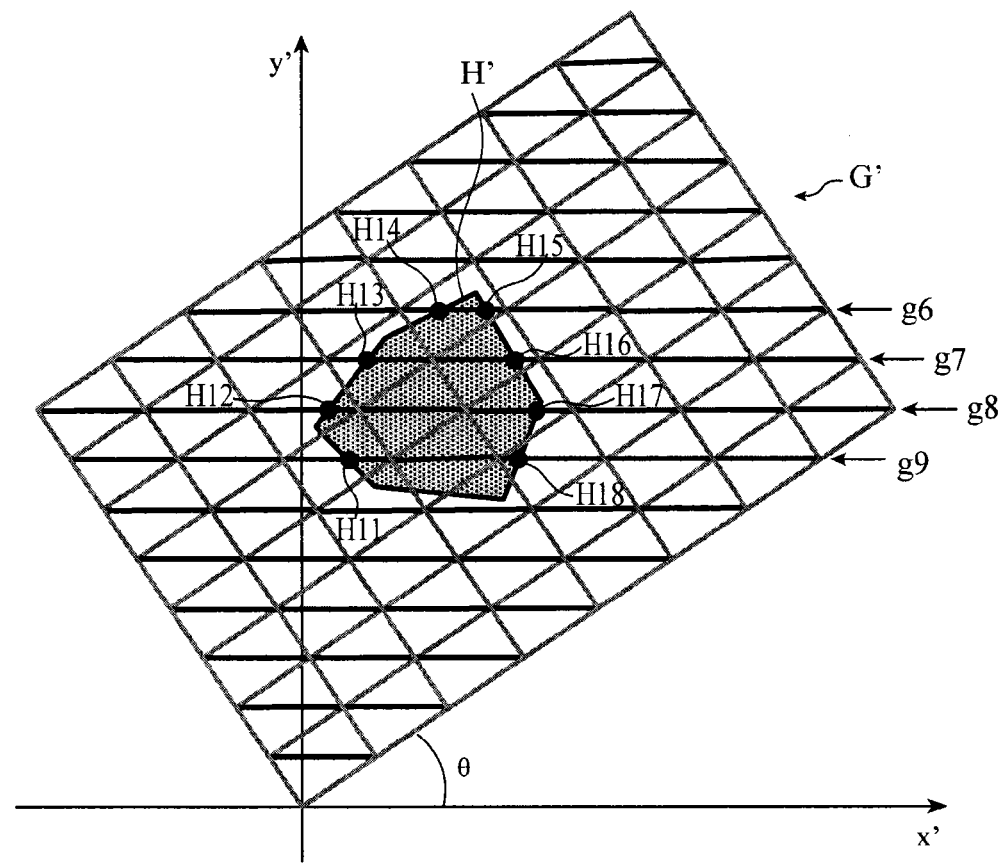
FIG. 11 is a diagram illustrating a calculation of intersection points with the segments parallel to the oblique line in the three-dimensional information processing apparatus according to Embodiment 1.

FIG. 11 is a diagram depicting the intersection points between the outer periphery of the building bottom surface H' and the segments which are parallel to the oblique lines out of the segments constituted by the set of terrain vertices G'. An example depicted in FIG. 11 illustrates a case where the outer periphery of the building bottom surface H' intersects segments g6, g7 g8, g9 parallel to the oblique lines at intersection points H11, H12, H13, H14, H15, H16, H17, H18, H19. When the inverse matrix of the R*T matrix is acted on these vertices, final intersection points with the segments parallel to the oblique lines can be obtained.

Figure 12:
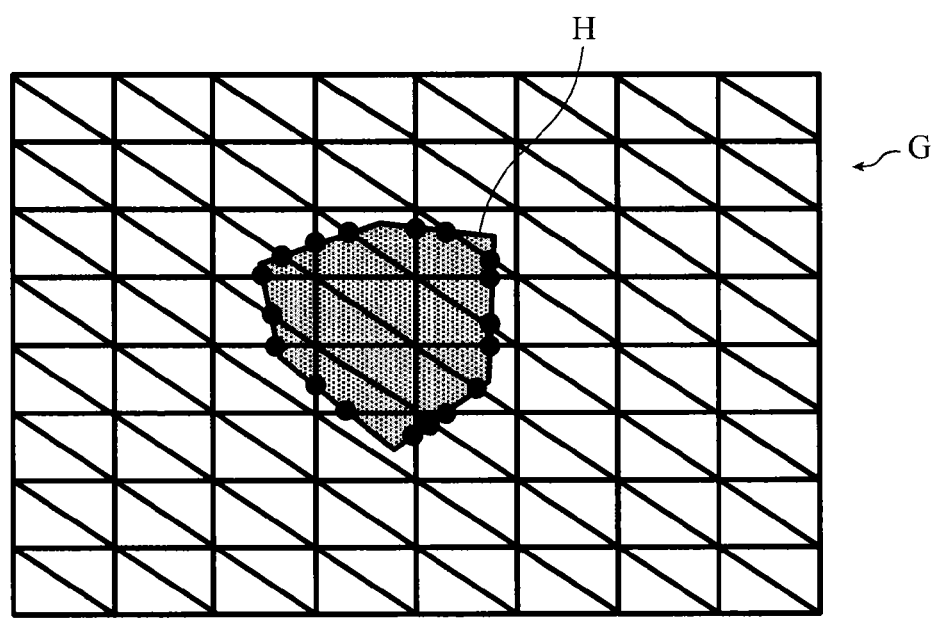
FIG. 12 is a diagram depicting intersection points between outer peripheral segments of a building bottom surface and segments constituted by a set of terrain vertices in the three-dimensional information processing apparatus according to Embodiment 1.

FIG. 12 depicts all the intersection points calculated by the three pieces of intersection point calculation processing illustrated in the above-described (a) to (c), that is, the intersection points between the outer peripheral segments of the building bottom surface H and the segments constituted by the set of terrain vertices G.

Figure 13:
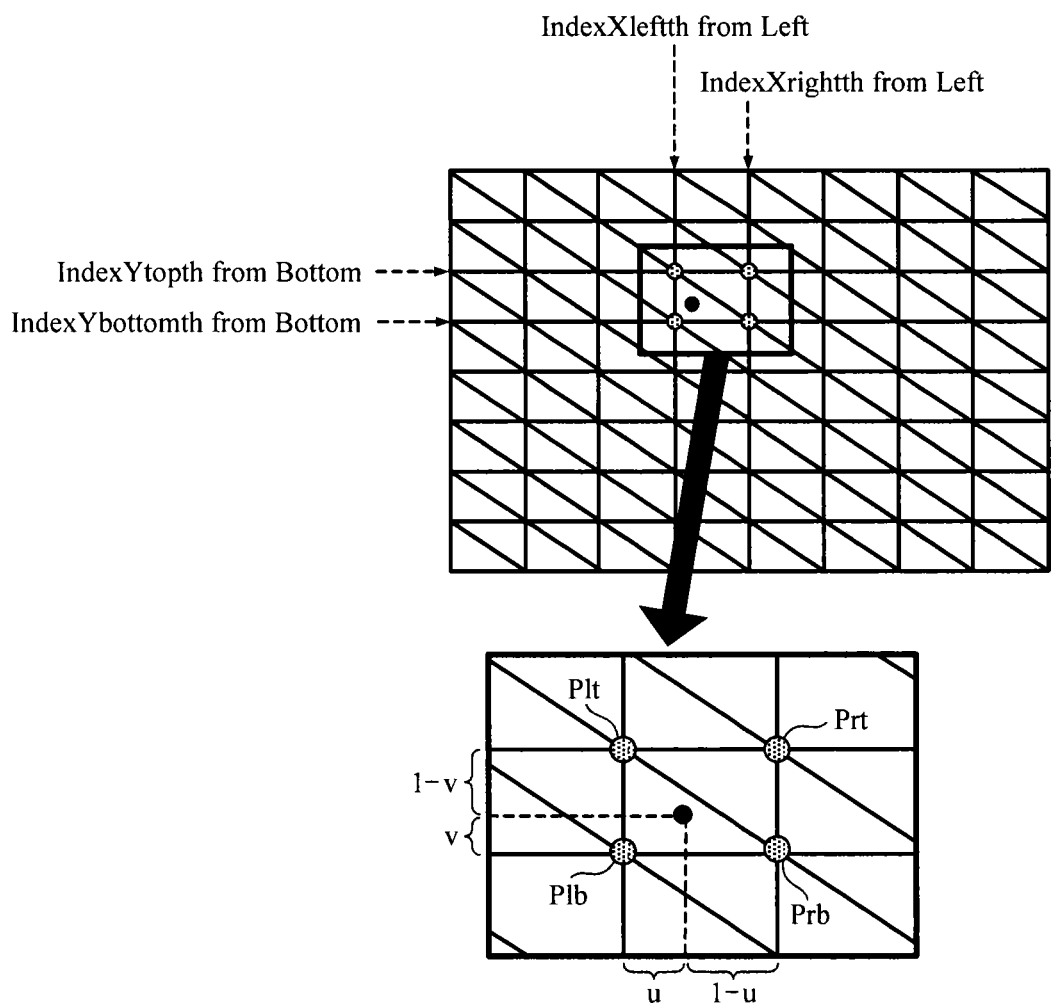
FIG. 13 is a diagram depicting an example of a calculation by an all-point height calculation unit in the three-dimensional information processing apparatus according to Embodiment 1.
Figure 13:
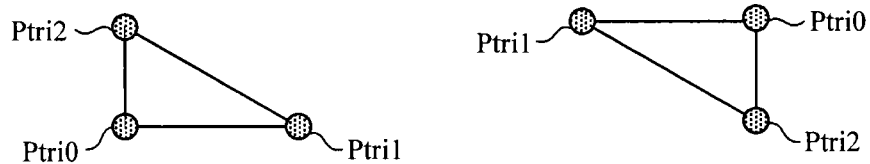

Then, the all-point height calculation unit 9 calculates heights at the X, Y coordinate positions of the intersection points calculated in step ST7 and at the X, Y coordinate positions of the vertices constituting the building bottom surface by using the set of terrain vertices (see FIG. 13). In the calculations of the heights at the X, Y coordinate positions of the vertices constituting the building bottom surface, it is first determined in which triangle in the set of terrain vertices each vertex exists (step ST8). In this case, when the X, Y coordinates of the vertex to be examined are denoted by $(X_t, Y_t)$, three vertices $P_{tri0}$, $P_{tri1}$, $P_{tri2}$ of the triangle in which the vertex to be examined exists are the ones as indicated by Expression (10) illustrated below.

if $\quad (10)$ $0 \le (u + v) \le 1$ then $P_{tri0} = P_{lb}, P_{tri1} = P_{rb}, P_{tri2} = P_{lt}$ -continued else $1 < (u + v)$ then $P_{tri0} = P_{rt}, P_{tri1} = P_{lt}, P_{tri2} = P_{rb}$ $$\begin{cases} \text{IndexX}_{left} = \text{floor}((X_t - X_i\text{MinMin})/X\text{Div}) \\ \text{IndexX}_{right} = \text{IndexX}_{left} + 1 \\ \text{IndexY}_{bottom} = \text{floor}((Y_t - Y_i\text{MinMin})/Y\text{Div}) \\ \text{IndexY}_{top} = \text{IndexY}_{bottom} + 1 \\ P_{lb} = P_c(\text{IndexX}_{left}, \text{IndexY}_{bottom}) \\ P_{rb} = P_c(\text{IndexX}_{right}, \text{IndexY}_{bottom}) \\ P_{lt} = P_c(\text{IndexX}_{left}, \text{IndexY}_{top}) \\ P_{rt} = P_c(\text{IndexX}_{right}, \text{IndexY}_{top}) \\ u = (X_t - P_{lb}\cdot x)/X\text{Div} \\ v = (Y_t - P_{lb}\cdot y)/Y\text{Div} \end{cases}$$

Subscripts .x and .y indicate the X and Y coordinates of a vertex, respectively.

Using the three vertices $P_{tri0}$, $P_{tri1}$, $P_{tri2}$ of the above-described triangle, a height $Z_1$ of the terrain at the X, Y coordinate position of the vertex to be examined is calculated in accordance with Expression (11) illustrated below (step ST9). When the processing in step ST8 and step ST9 are executed on the intersection points between the segments constituted by the set of terrain vertices and the outer peripheral segments of the building bottom surface, and on the vertices constituting the building bottom surface, a set of heights (a set of vertex heights) of the terrain at these points is calculated.

if $0 \le (u+v) \le 1$ then $Z_1 = u(P_{tri1}.z - P_{tri0}.z) + v(P_{tri2}.z - P_{tri0}.z)$ else $1 < (u+v)$ then $Z_1 = (1-w)(P_{tri1}.z - P_{tri0}.z) + (1-v)(P_{tri2}.z - P_{tri0}.z) \quad (11)$ In Expression (11), subscripts .z indicates the Z coordinate of a vertex.

The reference height calculation unit 10 extracts a point with the smallest height in the set of vertex heights calculated in step ST7, and the height of the extracted vertex is determined as a reference height (step ST10). Finally, the building height correction unit 11 calculates a difference between the reference height calculated in step ST10 and the vertex height calculated in step ST9, and the calculated difference value is added to the heights of all the vertices constituting the building model to thus correct the height of the building model (step ST11). The processing is then ended.

As described above, According to Embodiment 1, it is configured to include the bottom surface intersection point calculation unit 8 that calculates the intersection points where the outer periphery of the building bottom surface intersects with the set of terrain vertices, the reference height calculation unit 10 that extracts the point with the smallest height in the intersection points calculated by the bottom surface intersection point calculation unit 8 and determines the height of the extracted vertex to be the reference height, and the building height correction unit 11 that adapts the height of the building bottom surface to the reference height calculated by the reference height calculation unit 10 to thus adjust the height of the building model; thus, the amount of sinking can be suppressed at a minimum without occurrence of a gap between the terrain model and building models and without deeper sinking of the terrain model into the terrain than necessary.

Additionally, in Embodiment 1 described above, the building model is expressed by the hexagonal column; however, the expression of the building need not be limited to the hexagonal column, and all polygons are applicable thereto.

Furthermore, in Embodiment 1 described above, the direction of the oblique lines in the terrain model is depicted by a line joining the southeast to the northwest, but it may be depicted by the line joining the southwest to the northeast.

Furthermore, in Embodiment 1 described above, there is illustrated the case where the reference height calculation unit 10 determines the value corresponding to the smallest height in the set of vertex heights as the reference height. However, in view of the amount of sinking by which the terrain model sinks in the building model, for example, a mean value or a median for the set of terrain vertices may be set.

Embodiment 2

In Embodiment 1 described above, there is illustrated the configuration that suppresses the occurrence of the gap between the terrain model and the building models by changing the heights at the vertices constituting the terrain model. On the other hand, in Embodiment 2, there is described a configuration that creates a new model between the terrain model and the building model in order to fill the gap between the terrain model and the building models without changing the position of the building models.

Figure 14:
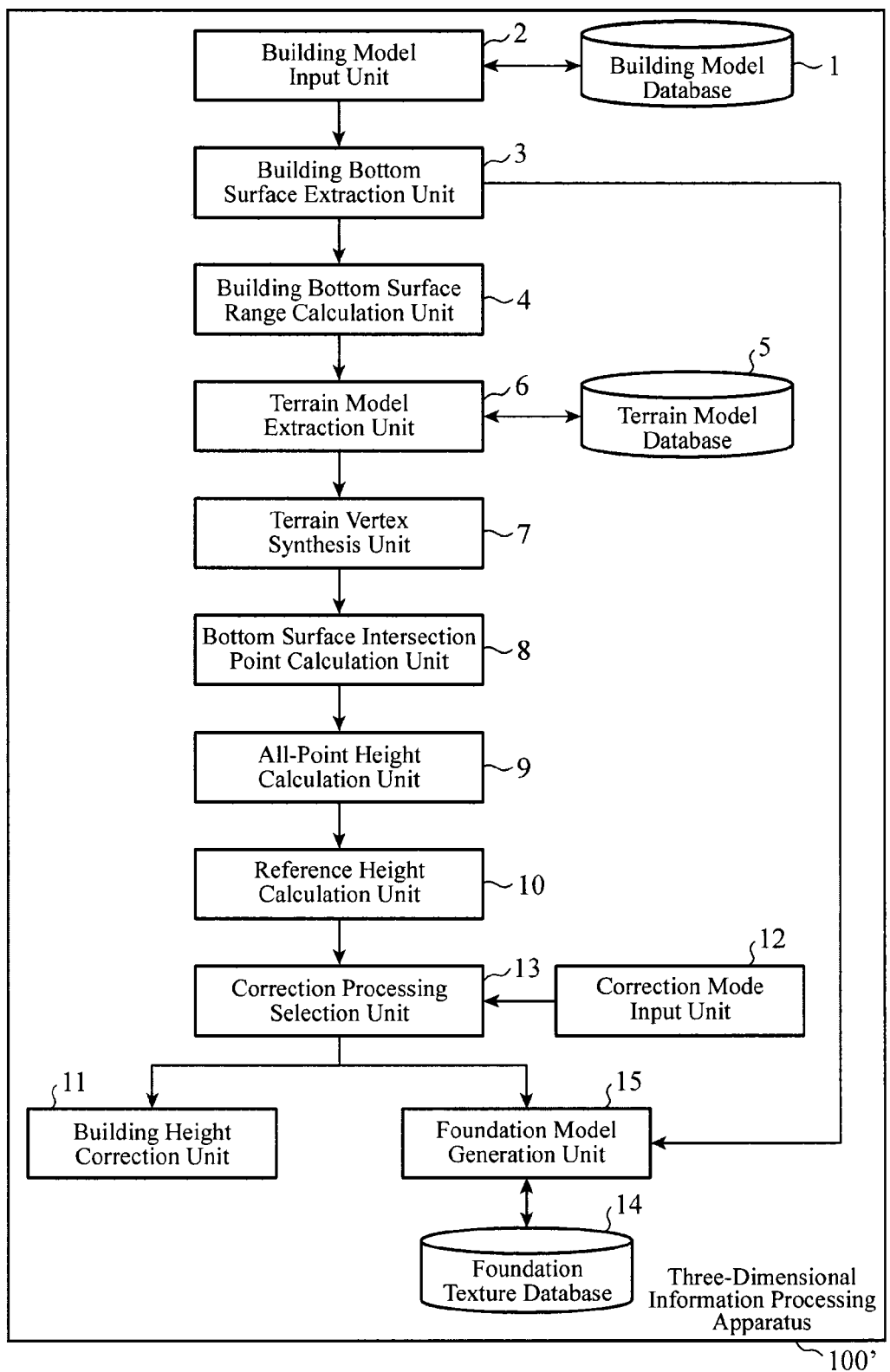
FIG. 14 is a block diagram depicting a configuration of a three-dimensional information processing apparatus according to Embodiment 2.

FIG. 14 is a block diagram depicting a configuration of a three-dimensional information processing apparatus according to Embodiment 2.

With respect to the three-dimensional information processing apparatus 100 in Embodiment 1 shown in FIG. 1, a three-dimensional information processing apparatus 100' depicted in FIG. 14 is additionally provided with a correction mode input unit 12, a correction process selection unit 13, a foundation texture database 14, and a foundation model generation unit 15. Note that the components that are the same as or equivalent to those of the three-dimensional information processing apparatus 100 illustrated in Embodiment 1 or portions corresponding to this three-dimensional information processing apparatus are denoted by the same reference numerals as those used in FIG. 1, and descriptions thereof will be omitted or simplified.

The correction mode input unit 12 receives an input of a correction mode from a user. The correction process selection unit 13 selects whether the subsequent correction processing is to be executed by the building height correction unit 11 or by the foundation model generation unit 15 in accordance with the correction mode that is input via the correction mode input unit 12. The foundation texture database 14 is a database that accumulates a plurality of foundation images. The foundation model generation unit 15 creates a foundation model using vertices constituting a building bottom surface extracted by the building bottom surface extraction unit 3, a reference height calculated by a reference height calculation unit 10, and foundation textures accumulated in the foundation texture database 14, and adds the created foundation model to the building model.

Figure 15:
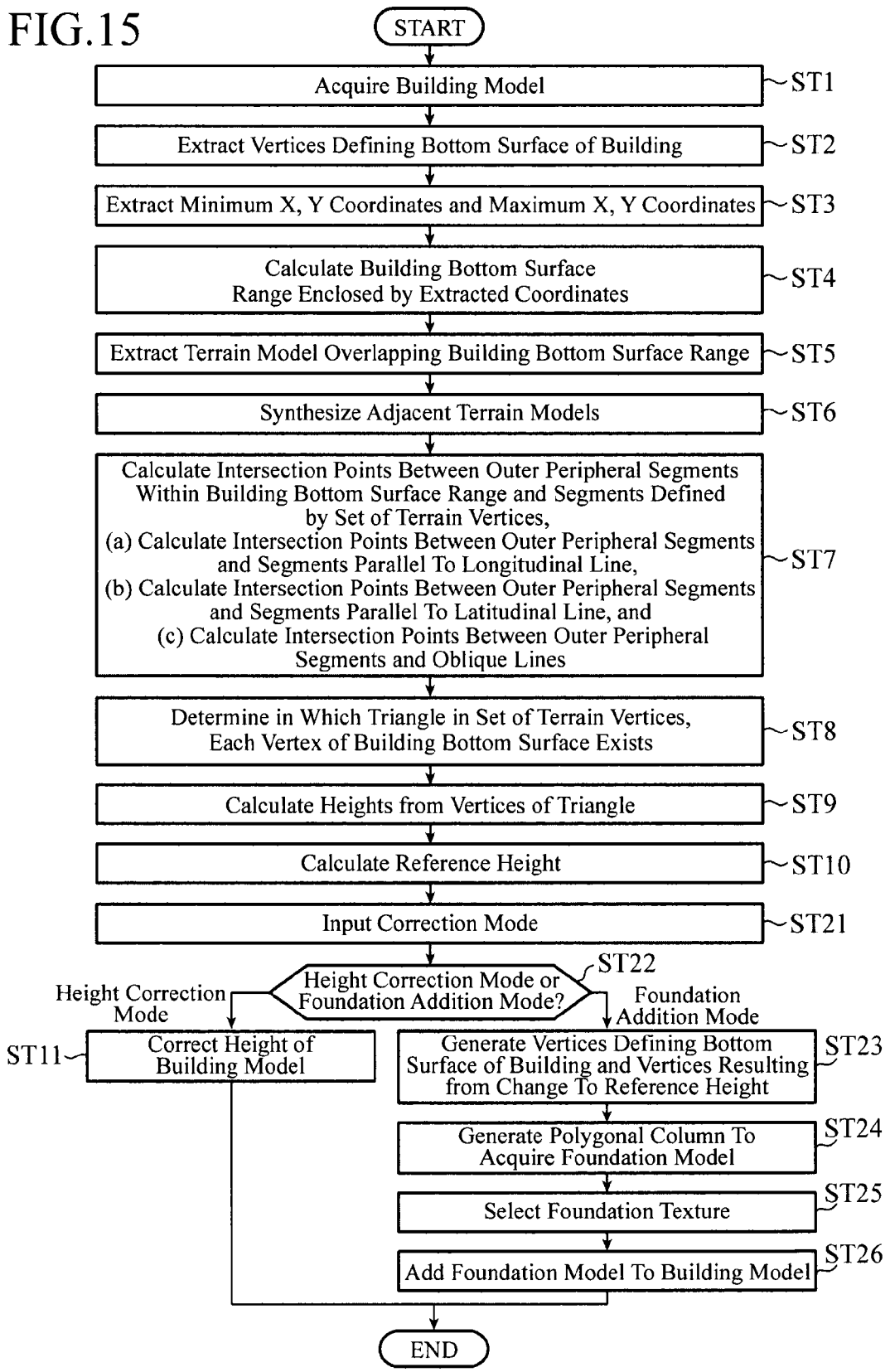
FIG. 15 is a flowchart illustrating operations of the three-dimensional information processing apparatus according to Embodiment 2.

Next, operations of the three-dimensional information processing apparatus 100' according to Embodiment 2 will be described. FIG. 15 is a flowchart showing the operations of the three-dimensional information processing apparatus according to Embodiment 2. Note that the steps that are the same as those of the three-dimensional information processing apparatus according to Embodiment 1 are hereinafter denoted by the same reference numerals as those used in FIG. 2, and descriptions thereof will be omitted or simplified.

In Embodiment 2, an input mode input via the correction mode input unit 12 is one of a height correction mode and a foundation addition mode, and has a function to adjust the height of a building in accordance with a user's intension for correction of the building model or to fill the gap using the foundation texture without changing the height of the building.

When the reference height calculation unit 10 calculates the reference height in step ST10, the correction mode input unit 12 receives the input of the correction mode from the user (step ST21). The correction process selection unit 13 determines whether the correction mode received in step ST21 is the height correction mode or the foundation addition mode (step ST22). When the correction mode is determined to be the height correction mode, the building height correction unit 11 performs height correction on the building model (step ST11), and ends the processing.

On the other hand, when the correction mode is determined to be the foundation addition mode, the foundation model generation unit 15 generates a group of vertices including the vertices constituting the building bottom surface extracted in step ST2 and the vertices resulting from the change of the heights at the above vertices to the reference height calculated in step ST10 (step ST23). Then, a polygonal column is formed such that the vertices of the building bottom surface are joined to the vertices after the change to the reference height with segments, respectively, to acquire the foundation model (step ST24).

Figure 16A:
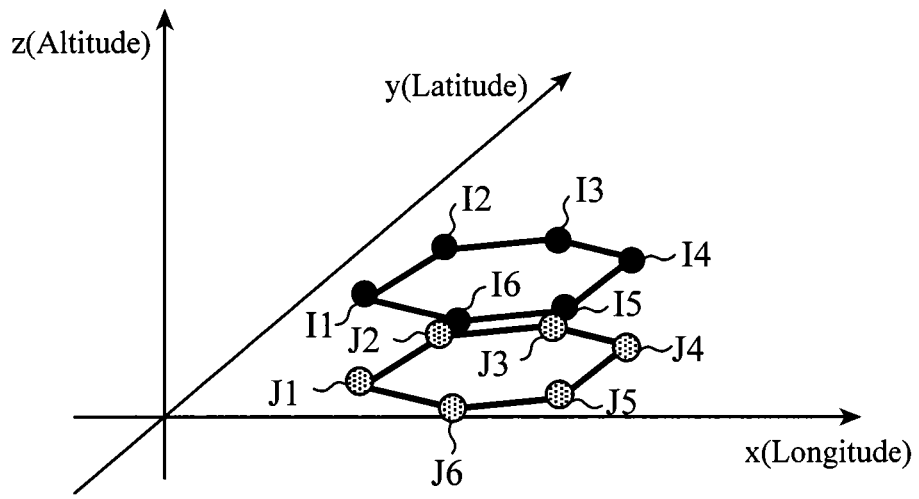
FIGS. 16A, 16B are diagrams illustrating acquisition of a foundation model in the three-dimensional information processing apparatus according to Embodiment 2.
Figure 16B:
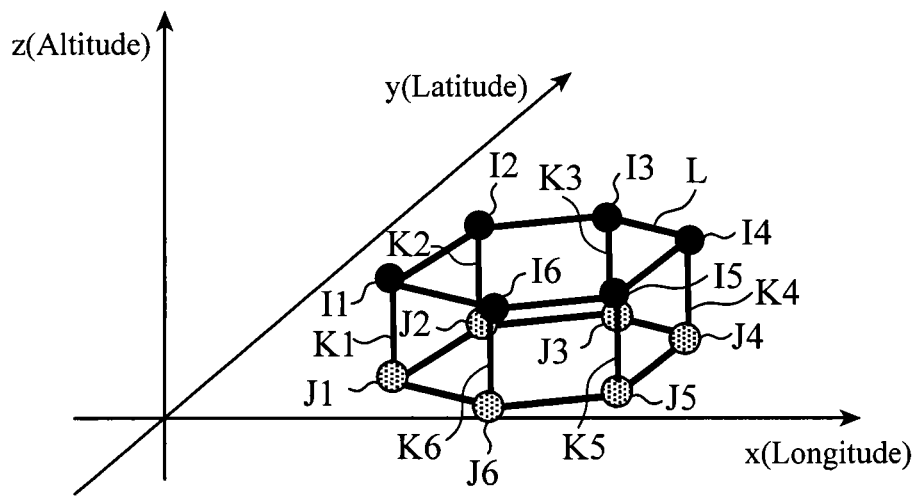

FIGS. 16A, 16B are diagrams illustrating an acquisition of the foundation model; FIG. 16A is a bird's eye view illustrating the change of the vertices constituting the building bottom surface to the reference height, and FIG. 16B is a bird's eye view illustrating the generation of the polygonal column that is the foundation model.

In an example depicted in FIG. 16A, first, in step ST23, vertices I1, I2, I3, I4, I5, and I6 constituting the building bottom surface are changed to the reference height to thus generate changed vertices J1, J2, J3, J4, J5, J6. Then, as depicted in FIG. 16(*b*), in step ST24, the vertex I1 and the vertex J1 are jointed together with a segment K1, the vertex I2 and the vertex J2 are jointed together with a segment K2, the vertex I3 and the vertex J3 are jointed together with a segment K3, the vertex I4 and the vertex J4 are jointed together with a segment K4, the vertex I5 and the vertex J5 are jointed together with a segment K5, and the vertex I6 and the vertex J6 are jointed together with a segment K6 to generate a hexagonal column L to thereby acquire the foundation model.

Additionally, the foundation model acquired in step ST24 includes only a plurality of pieces of vertex information, and display colors in multiple surfaces are uncertain, and thus, the foundation model generation unit 15 selects one of the foundation textures accumulated in the foundation texture database 14 (step ST25). The foundation model generation unit 15 determines the foundation texture selected in step ST25 as a mapping texture for the foundation model acquired in step ST24, and adds the foundation model to the building model (step ST26), and ends the processing.

Additionally, in the selection of the foundation texture in step ST25, one appropriate foundation texture may be randomly selected; alternatively, it may be configured to prepare a set of textures corresponding to cities where the buildings exist in advance, raw materials for the buildings, and/or the like on a one-to-one basis, and search the corresponding set in accordance with the place of the building or the raw material to select the texture, thus selecting the foundation model with an appearance suitable for the atmosphere of the land.

As described above, according to Embodiment 2, it is configured as follows: when the received correction mode is the foundation addition mode, the polygonal column is prepared such that a polygon formed by the vertices constituting the building bottom surface is an upper surface of the polygonal column, and that a polygon formed by the vertices at the smallest height in the intersection points where the outer periphery of the building bottom surface and the terrain intersect each other is a lower surface of the polygonal column, and the resultant polygonal column is determined as the foundation model, and the foundation model is then added to the building model; thus, when desiring to avoid a change in the position of the building itself, the user can fill the gap between the terrain and the building without moving the position of the building.

Additionally, according to Embodiment 2, there is illustrated the configuration in which the foundation model generation unit 15 sets the shape of each of the upper surface and lower surface of the foundation model to be similar to that of the building bottom surface. However, for example, it may be generated as a rectangular parallelepiped which uses a rectangular shape that is a circumscribing rectangle of the building bottom surface. As long as the polygonal column is shaped to encompass the building in the X-Y directions and has an upper surface corresponding to a height of the building bottom surface and a lower surface corresponding to the height of reference, any shapes may be used to create the foundation model that exerts similar effects.

Within the scope of the present invention, the embodiments may be freely combined together, or any component of each embodiment may be deformed, or any component of each embodiment may be omitted.

INDUSTRIAL APPLICABILITY

As described above, the three-dimensional information processing apparatus according to the present invention is applicable to a navigation apparatus and the like which have such a three-dimensional map bird's-eye-view display function as to arrange the building models such as commercial facilities on the rough three-dimensional terrain model and display these models in a bird's-eye-view manner, and the apparatus can suppress mismatch of display data caused by positioning errors included in data obtained through field positioning.

DESCRIPTION OF REFERENCE NUMERALS AND SIGNS

1: Building model database
2: Building model input unit
3: Building bottom surface extraction unit
4: Building bottom surface range calculation unit
5: Terrain model database
6: Terrain model extraction unit
7: Terrain vertex synthesis unit
8: Bottom surface intersection point calculation unit
9: All-point height calculation unit
10: Reference height calculation unit
11: Building height correction unit
12: Correction mode input unit
13: Correction processing selection unit
14: Foundation texture database
15: Foundation model generation unit
100, 100': Three-dimensional information processing apparatus.

The invention claimed is:

1. A three-dimensional information processing apparatus generating three-dimensional information on a predetermined area with a terrain model representing a terrain in the predetermined area by three-dimensional coordinates and a structure model representing a structure positioned in the predetermined area by the three-dimensional coordinates, the apparatus comprising:
a structure bottom surface range calculator that determines, as a bottom surface range of the structure model, a range including a bottom surface of the structure model;
a terrain vertex synthesizer that determines a set of vertices for the terrain model including the bottom surface range of the structure model;
a bottom surface intersection point calculator that determines intersection points between segments formed by the set of vertices for the terrain model and outer peripheral segments of the bottom surface of the structure model;
an all-point height calculator that determines heights of the terrain model at the intersection points and at a plurality of points constituting the bottom surface of the structure model;
a reference height calculator that determines a reference height in three-dimensional information on the predetermined area from the heights of the terrain model; and
a structure height corrector that corrects the height of the structure model using the reference height and the heights of the terrain model at the plurality of points constituting the bottom surface of the structure model.

2. The three-dimensional information processing apparatus according to claim 1, wherein the bottom surface intersection point calculator calculates, as two-dimensional coordinates, intersection points between a group of two-dimensional segments constituted by the set of vertices resulting from projection of the terrain model determined by the terrain vertex synthesizer onto a horizontal surface, and a group of two-dimensional segments resulting from projection of outer peripheral segments of the bottom surface of the structure model onto the horizontal surface.

3. The three-dimensional information processing apparatus according to claim 2, wherein the all-point height calculator determines to which triangle in a set of triangles formed by the group of two-dimensional segments constituted by the set of vertices resulting from the projection of the terrain model onto the horizontal plane, the two-dimensional coordinates of the intersection points determined by the bottom surface intersection point calculator and the plurality of points constituting the bottom surface of the structure model belong, and performs linear interpolation by using the heights of the three vertices constituting the determined triangle to thereby determine the heights of the terrain model at the intersection points and at the plurality of points.

4. The three-dimensional information processing apparatus according to claim 1, wherein the reference height calculator determines as the reference height any of a minimum value, a mean value, and a median for the heights of the terrain model determined by the all-point height calculator.

5. The three-dimensional information processing apparatus according to claim 1, comprising:
- a foundation model generator that determines a foundation model based on the bottom surface of the structure model and the reference height determined by the reference height calculator, and adds the determined foundation model to a gap generated between the terrain model and the structure model;
- a correction mode input processor that receives a designation of a correction mode from a user; and
- a correction processing selector that selects one of correction processing for the height of the structure model executed by the structure height corrector and addition processing of the foundation model executed by the foundation model generator, in accordance with the correction mode received by the correction mode input processor.

6. The three-dimensional information processing apparatus according to claim 5, wherein the foundation model generator determines as the foundation model a polygonal column in which the bottom surface of the structure model corresponds to an upper surface of the foundation model and a plane formed by the vertices constituting the reference height corresponds to a lower surface of the foundation model.

7. The three-dimensional information processing apparatus according to claim 6, wherein the foundation model generator refers to a foundation texture database in which textures of the foundation model are accumulated, and selects a texture applied to a side surface of the foundation model of the determined polygonal column.

* * * * *